United States Patent
Neville et al.

(10) Patent No.: US 12,331,656 B2
(45) Date of Patent: Jun. 17, 2025

(54) METHODS OF FORMING OR REPAIRING PART WITH OVERHUNG SECTION, AND RELATED TURBOMACHINE PART

(71) Applicant: GENERAL ELECTRIC COMPANY, Schenectady, NY (US)

(72) Inventors: Jason Neville, Greenville, SC (US); Jillian Jamison Woolridge, Greenville, SC (US); Jacob Andrew Salm, Greenville, SC (US); Kassy Moy Hart, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/255,984

(22) PCT Filed: Dec. 8, 2020

(86) PCT No.: PCT/US2020/063759
§ 371 (c)(1),
(2) Date: Jun. 5, 2023

(87) PCT Pub. No.: WO2022/125075
PCT Pub. Date: Jun. 16, 2022

(65) Prior Publication Data
US 2024/0052750 A1    Feb. 15, 2024

(51) Int. Cl.
*F01D 5/20* (2006.01)
*F01D 5/22* (2006.01)

(52) U.S. Cl.
CPC ............... *F01D 5/20* (2013.01); *F01D 5/22* (2013.01); *F05D 2220/30* (2013.01); *F05D 2230/80* (2013.01); *F05D 2240/307* (2013.01)

(58) Field of Classification Search
None
See application file for complete search history.

(56) References Cited

U.S. PATENT DOCUMENTS

| | | |
|---|---|---|
| 4,671,448 A | 6/1987 | Million et al. |
| 5,160,822 A | 11/1992 | Aleshin |

(Continued)

FOREIGN PATENT DOCUMENTS

| | | | |
|---|---|---|---|
| EP | 2774715 A1 | 9/2014 | |
| EP | 3517237 A1 * | 7/2019 | ............... B23K 9/04 |

(Continued)

OTHER PUBLICATIONS

Notice of Reasons for Refusal in JP2023532347, mailed Jul. 30, 2024, 11 pages.

(Continued)

*Primary Examiner* — Kayla Mccaffrey
(74) *Attorney, Agent, or Firm* — James Pemrick; Charlotte Wilson; Hoffman Warnick LLC

(57) ABSTRACT

Method of forming or repairing a part with an overhung section. The method may include removing a portion, and adding a section to the part. The section includes the overhung section. The adding includes sequentially layering at least one plurality of material layers on the part, the at least one plurality of material layers approximating dimensions of the section including the overhung section. The sequential layering may include, for example, laser welding, and may be carried out in a number of ways that create varied layers within the overhung section. The method may include machining the at least one plurality of material layers to form the section including the overhung section.

12 Claims, 10 Drawing Sheets

(56) References Cited

U.S. PATENT DOCUMENTS

| | | | |
|---|---|---|---|
| 5,794,338 A * | 8/1998 | Bowden, Jr. | F01D 5/005 |
| | | | 29/402.09 |
| 6,118,098 A * | 9/2000 | Amos | B65B 1/06 |
| | | | 219/136 |
| 6,144,008 A | 11/2000 | Rabinovich | |
| 6,332,272 B1 | 12/2001 | Sinnott et al. | |
| 6,672,829 B1 * | 1/2004 | Cherry | F01D 5/141 |
| | | | 415/115 |
| 6,811,744 B2 | 11/2004 | Keicher et al. | |
| 7,695,248 B2 * | 4/2010 | Mons | B22F 12/53 |
| | | | 219/121.64 |
| 8,726,501 B2 | 5/2014 | Schoonover et al. | |
| 9,868,180 B2 | 1/2018 | Henderson et al. | |
| 10,458,250 B2 * | 10/2019 | Arjakine | B23P 6/007 |
| 10,478,921 B2 * | 11/2019 | Arjakine | F01D 5/005 |
| 10,486,255 B2 | 11/2019 | Rose | |
| 11,400,550 B2 * | 8/2022 | Shin | B23P 6/005 |
| 2006/0003095 A1 * | 1/2006 | Bullen | B22F 3/004 |
| | | | 427/256 |
| 2008/0044289 A1 | 2/2008 | Klasing et al. | |
| 2009/0313823 A1 | 12/2009 | Rockstroh et al. | |
| 2010/0221122 A1 | 9/2010 | Klasing et al. | |
| 2016/0045982 A1 | 2/2016 | Stoodt et al. | |
| 2017/0144252 A1 | 5/2017 | Arjakine et al. | |
| 2018/0328212 A1 | 11/2018 | Subramaniyan | |
| 2021/0299802 A1 | 9/2021 | Shin | |

FOREIGN PATENT DOCUMENTS

| | | |
|---|---|---|
| JP | H1080767 A | 3/1998 |
| JP | H10339103 A | 12/1998 |
| JP | 2008051094 A | 3/2008 |
| JP | 2008051097 A | 3/2008 |
| JP | 2011052686 A | 3/2011 |
| JP | 2011525593 A | 9/2011 |
| JP | 2012229639 A | 11/2012 |
| JP | 2013 068085 A | 4/2013 |
| JP | 2013 148061 A | 8/2013 |
| JP | 2013194694 A | 9/2013 |
| KR | 102278830 B1 | 7/2021 |
| KR | 102302909 B1 | 9/2021 |
| WO | 0151772 A1 | 7/2001 |
| WO | 2015150019 A1 | 10/2015 |
| WO | 2017074372 A1 | 5/2017 |

OTHER PUBLICATIONS

Non-Final Office Action dated Dec. 31, 2024 for U.S. Appl. No. 18/255,770, 15 pages.

Notice of Allowance in JP2023530311, mailed Nov. 13, 2024, 7 pages.

* cited by examiner

METHODS OF FORMING OR REPAIRING PART WITH OVERHUNG SECTION, AND RELATED TURBOMACHINE PART

TECHNICAL FIELD

The disclosure relates generally to part manufacturing and repair, and more particularly, to methods of forming or repairing a turbomachine part, such as a turbomachine blade, with an overhung section.

BACKGROUND

Industrial parts may include portions that overhang other sections of the part. The overhung sections may need to be added during formation, or repaired after a period of use. One illustrative application includes flared tips of turbomachine blades, such as those available from General Electric Co., Schenectady, NY. Flared tip turbomachine blades include an airfoil having a pressure side and a suction side coupled along leading and trailing edges. The flared tip is coupled to a radially outer end of the airfoil, and may extend circumferentially beyond the pressure side and/or suction side of the airfoil, i.e., using an axis of the turbomachine as a reference. Traditional non-flared turbomachine blades require a two-dimensional build-up of material in the vertical or radial direction, e.g., using casting or additive manufacture. For manufacture of flared tip turbomachine blades, material is added in both the circumferential and radial direction. Repair of the flared tip turbomachine blades is currently not possible, so they are replaced. Similar situations exist with other turbomachine hot gas path components, and other industrial parts, having overhung sections.

BRIEF DESCRIPTION

An aspect of the disclosure provides a turbomachine part, comprising: a body having a first side, a second side and a longitudinal axis; and an overhung section extending in an overhung manner from at least one of the first side and the second side of the body, wherein at least a portion of the overhung section includes a plurality of material layers, wherein each material layer extends at an acute angle relative to the longitudinal axis of the body.

Another aspect of the disclosure relates to a method, comprising: adding a section to a part, the section including an overhung section, the adding including sequentially layering a plurality of material layers on a surface of the part, the plurality of material layers approximating dimensions of the section including the overhung section; and machining the plurality of material layers to form the section including the overhung section.

An aspect of the disclosure relates to a method of forming an overhung section on a part, the method comprising: forming a surface on the part, the surface being at an angle that is neither perpendicular nor parallel to a target outer planar surface of the overhung section; sequentially layering a plurality of material layers on the part, the plurality of material layers approximating dimensions of the overhung section; and machining the plurality of material layers to form the overhung section and the target outer planar surface, the target outer planar surface being at the angle relative to the plurality of material layers.

An aspect of the disclosure provides a turbomachine part, comprising: a body having a first side, a second side and a longitudinal axis; and an overhung section extending in an overhung manner from at least one of the first side and the second side of the body, wherein at least a portion of the overhung section includes a plurality of material layers, wherein each material layer extends at a perpendicular angle relative to a longitudinal axis of the body.

Another aspect of the disclosure includes a turbomachine part, comprising: a body having a first side and a second side; and an overhung section extending in an overhung manner from at least one of the first side and the second side of the body, wherein at least a portion of the overhung section includes a first plurality of material layers extending in a first direction, and a second plurality of material layers extending in a second direction at a non-coplanar direction relative to the first direction of the first plurality of material layers.

An aspect of the disclosure relates to a method, comprising: adding a section to a part, the section including an overhung section, the adding including: sequentially layering a first plurality of material layers on the part extending in a first direction; and sequentially layering a second plurality of material layers on the part extending in a second direction, different from the first direction, the second plurality of material layers meeting with the first plurality of material layers, wherein the first plurality of material layers and the second plurality of material layers collectively approximate dimensions of the section including the overhung section and are non-coplanar relative to one another; and machining the first plurality of material layers and the second plurality of material layers to form the section including the overhung section.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
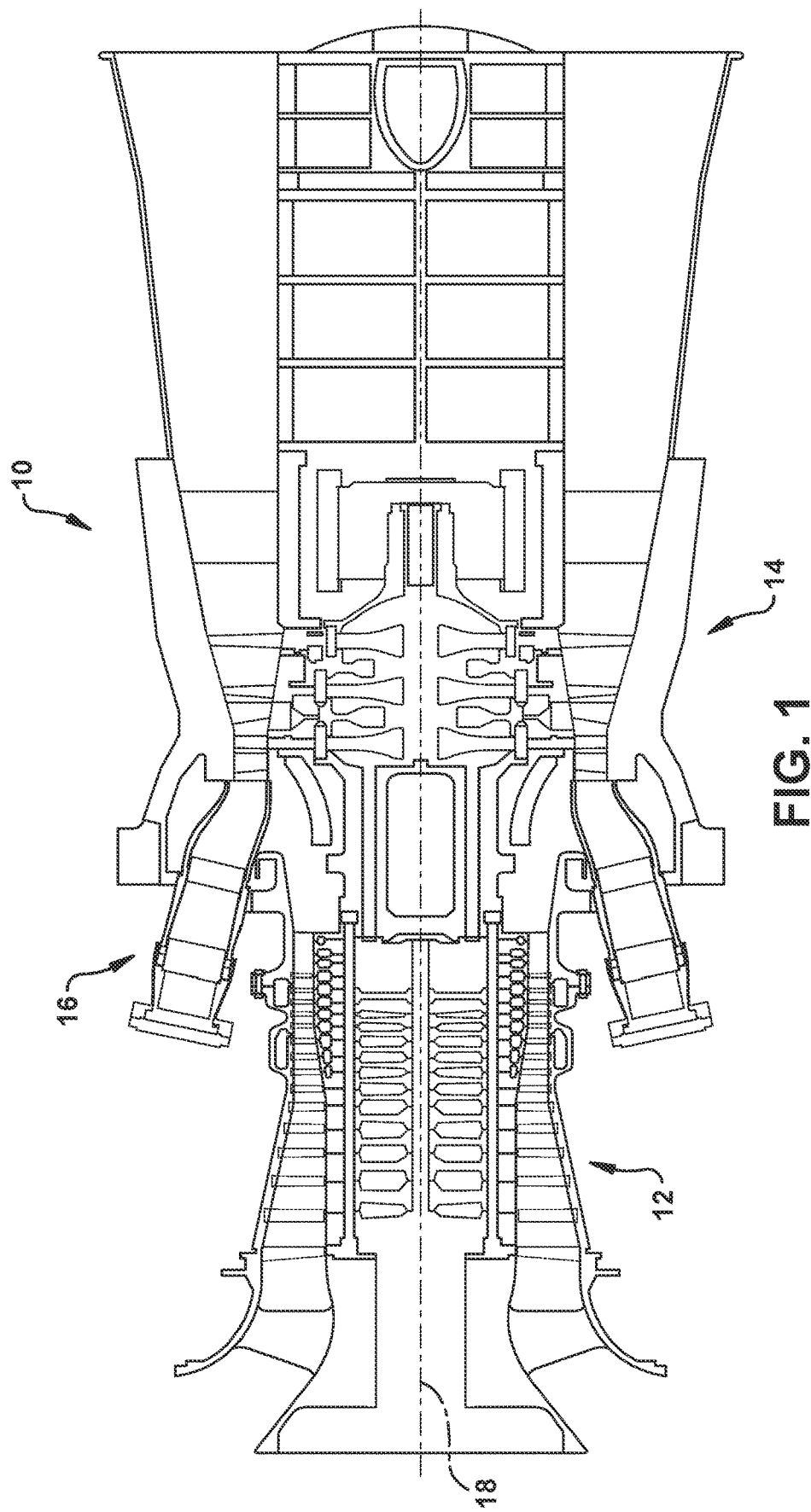
FIG. 1 is a schematic representation of an illustrative industrial application in the form of a gas turbine including a turbomachine part with an overhung section such as a flared tip rail, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

Aspects and advantages of the present application are set forth below in the following description, or may be obvious from the description, or may be learned through practice of the disclosure. Reference will now be made in detail to present embodiments of the disclosure, one or more examples of which are illustrated in the accompanying drawings. The detailed description uses numerical designations to refer to features in the drawings. As will be appreciated, each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. It is intended that the present disclosure covers such modifications and variations as come within the scope of the appended claims and their equivalents. Certain terms have been selected to describe the present disclosure and its component subsystems and parts. To the extent possible, these terms have been chosen based on the terminology common to the technology field. Still it will be appreciated that such terms often are subject to differing interpretations. For example, what may be referred to herein as a single component, may be referenced elsewhere as consisting of multiple components, or, what may be referenced herein as including multiple components, may be referred to elsewhere as being a single component. Thus, in understanding the scope of the present disclosure, attention should not only be paid to the particular terminology used, but also to the accompanying description and context, as well as the structure, configuration, function, and/or usage of the component being referenced and described, including the manner in which the term relates to the several figures, as well as, the precise usage of the terminology in the appended claims. Further, while the following examples are presented in relation to an illustrative application of a turbomachine blade usable in a compressor or turbine of a gas turbine system, the technology of the present application also may be applicable to other categories of turbomachines, without limitation, and a large variety of other industrial parts, as would be understood by a person of ordinary skill in the relevant technological arts.

Given the nature of how gas turbines operate, several terms prove particularly useful in describing certain aspects of their function, and may be advantageous in describing the methods disclosed. As will be understood, these terms may be used both in describing the gas turbine or one of the subsystems thereof, e.g., the compressor, combustor, or turbine, as well as to describe or claim components or subcomponents for usage therewithin. In the latter case, the terminology should be understood as describing those components as they would be upon proper installation and/or function within the gas turbine engine or primary subsystem. These terms and their definitions, unless specifically stated otherwise, are as follows.

The terms "forward" and "aft" refer to directions relative to the orientation of the gas turbine and, more specifically, the relative positioning of the compressor and turbine sections of the engine. Thus, as used therein, the term "forward"

refers to the compressor end while "aft" refers to the turbine end. It will be appreciated that each of these terms may be used to indicate direction of movement or relative position along the central axis of the engine. As stated above, these terms may be used to describe attributes of the gas turbine or one of its primary subsystems, as well as for components or subcomponents positioned therewithin. Thus, for example, when a component, such as a turbomachine blade, is described or claimed as having a "forward face", it may be understood as referring to a face that faces toward the forward direction as defined by the orientation of the gas turbine (i.e., the compressor being designated as the forward end and turbine being designated as the aft end). To take a major subsystem like the turbine as another example (and assuming a typical gas turbine arrangement such as the one shown in FIG. 1), the forward and aft directions may be defined relative to a forward end of the turbine, at where a working fluid enters the turbine, and an aft end of the turbine, at where the working fluid exits the turbine.

The terms "downstream" and "upstream" are used herein to indicate position within a specified conduit or flowpath relative to the direction of flow (hereinafter "flow direction") moving through it. Thus, the term "downstream" refers to the direction in which a fluid is flowing through the specified conduit, while "upstream" refers to the direction opposite to that. These terms may be construed as referring to the flow direction through the conduit given normal or anticipated operation. Given the configuration of gas turbines, particularly the arrangement of the compressor and turbine sections about a common shaft or rotor, as well as the cylindrical configuration common to many combustor types, terms describing position relative to an axis may be regularly used herein. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as being either "radially inward" or "inboard" of the second component. If, on the other hand, the first component resides further from the central axis, the first component will be described as being either "radially outward" or "outboard" of the second component. As used herein, the term "axial" refers to movement or position parallel to an axis, while the term "circumferential" refers to movement or position around an axis. Unless otherwise stated or plainly contextually apparent, these terms should be construed as relating to the central axis of the compressor and/or turbine sections of the gas turbine as defined by the rotor extending through each, even if the terms are describing or claiming attributes of non-integral components—such as rotor or stator blades—that function therein.

The term "turbomachine blade" or "blade", without further specificity, is a reference to the rotating blades of either the compressor or the turbine, and so may include both compressor rotor blades and turbine rotor blades, and may also be a reference to stationary blades of either the compressor or the turbine and so may include both compressor stator blades and turbine stator blades. The term "blades" may be used to generally refer to either type of blade. Thus, without further specificity, the term "turbomachine blade" or "blade" is inclusive to all type of turbine engine blades, including compressor rotor blades, compressor stator blades, turbine rotor blades, turbine stator blades, and the like.

In addition, several descriptive terms may be used regularly herein, as described below. The terms "first", "second", and "third" may be used interchangeably to distinguish one component from another and are not intended to signify location or importance of the individual components.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not occur or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 2:
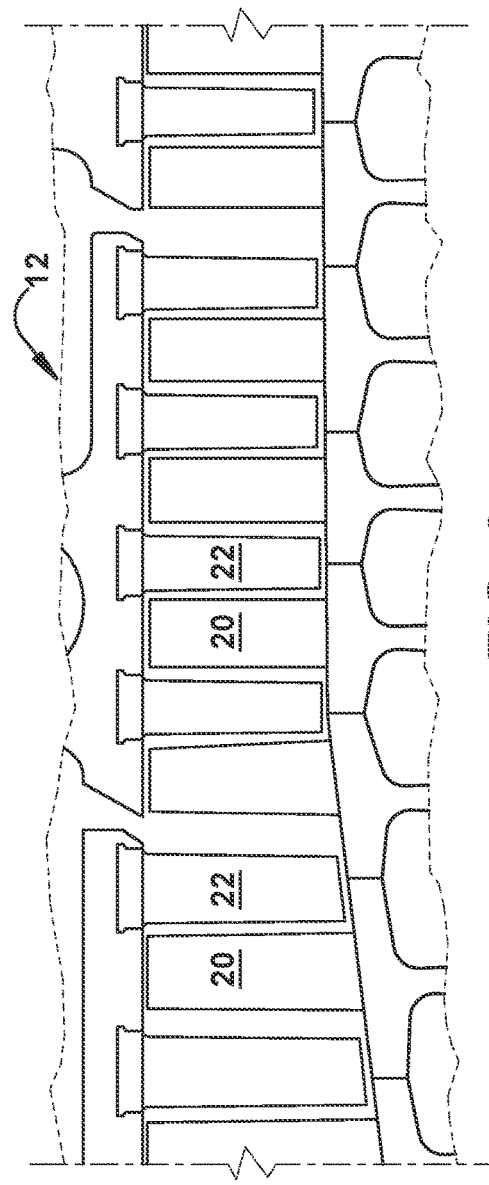
FIG. 2 is a sectional view of the compressor section of the gas turbine of FIG. 1.
Figure 3:
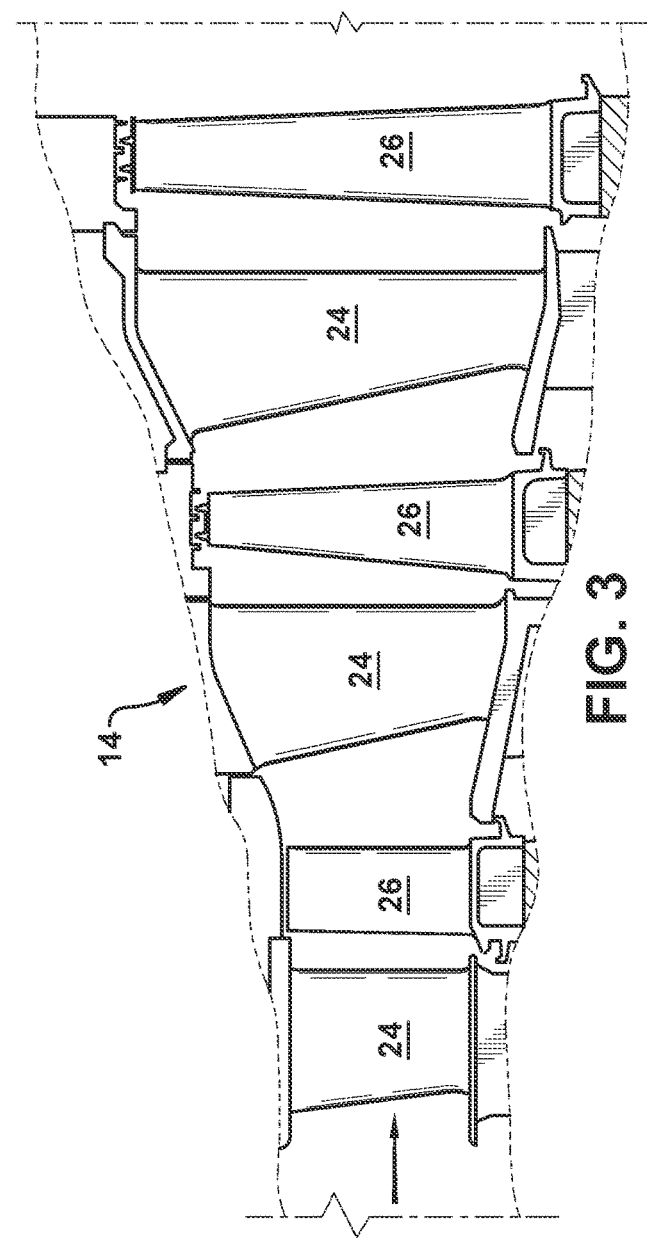
FIG. 3 is a sectional view of the turbine section of the gas turbine of FIG. 1.

By way of background, referring now with specificity to the figures, FIGS. 1-3 illustrate an illustrative gas turbine in accordance with the present disclosure or within which turbomachine parts of the present disclosure may be used. FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 12 that is mechanically coupled by a common shaft or rotor to a downstream turbine section or turbine 14, and a combustor 16 positioned between compressor 12 and turbine 14. As illustrated in FIG. 1, gas turbine 10 may be formed about a common central axis 18.

FIG. 2 illustrates a view of an illustrative multi-staged axial compressor 12 that may be used in gas turbine 10 of FIG. 1. As shown, compressor 12 may have a plurality of stages, each of which include a row of compressor rotor blades 20 and a row of compressor stator blades 22. Thus, a first stage may include a row of compressor rotor blades 20, which rotate about a central shaft, followed by a row of compressor stator blades 22, which remain stationary during operation. FIG. 3 illustrates a partial view of an illustrative turbine section or turbine 14 that may be used in gas turbine 10 of FIG. 1. Turbine 14 also may include a plurality of stages. Three illustrative stages are shown, but more or less may be present. Each stage may include a plurality of turbine nozzles or stator blades 24, which remain stationary during operation, followed by a plurality of turbine buckets or rotor blades 26, which rotate about the shaft during operation. Turbine stator blades 24 generally are circumferentially spaced one from the other and fixed about the axis of rotation to an outer casing. Turbine rotor blades 26 may be mounted on a turbine wheel or rotor disc (not shown) for rotation about a central axis. It will be appreciated that turbine stator blades 24 and turbine rotor blades 26 lie in the hot gas path or working fluid flowpath through turbine 14. The direction of flow of the combustion gases or working fluid within the working fluid flowpath is indicated by the arrow.

In one example of operation for gas turbine 10, the rotation of compressor rotor blades 20 within axial compressor 12 may compress a flow of air. In combustor 16, energy may be released when the compressed air is mixed with a fuel and ignited. The resulting flow of hot gases or working fluid from combustor 16 is then directed over turbine rotor blades 26, which induces the rotation of turbine rotor blades 26 about the shaft. In this way, the energy of the flow of working fluid is transformed into the mechanical energy of the rotating blades and, given the connection between the rotor blades and the shaft, the rotating shaft. The mechanical energy of the shaft may then be used to drive the rotation of compressor rotor blades 20, such that the necessary supply of compressed air is produced, and/or, for example, a generator to produce electricity.

Figure 4:
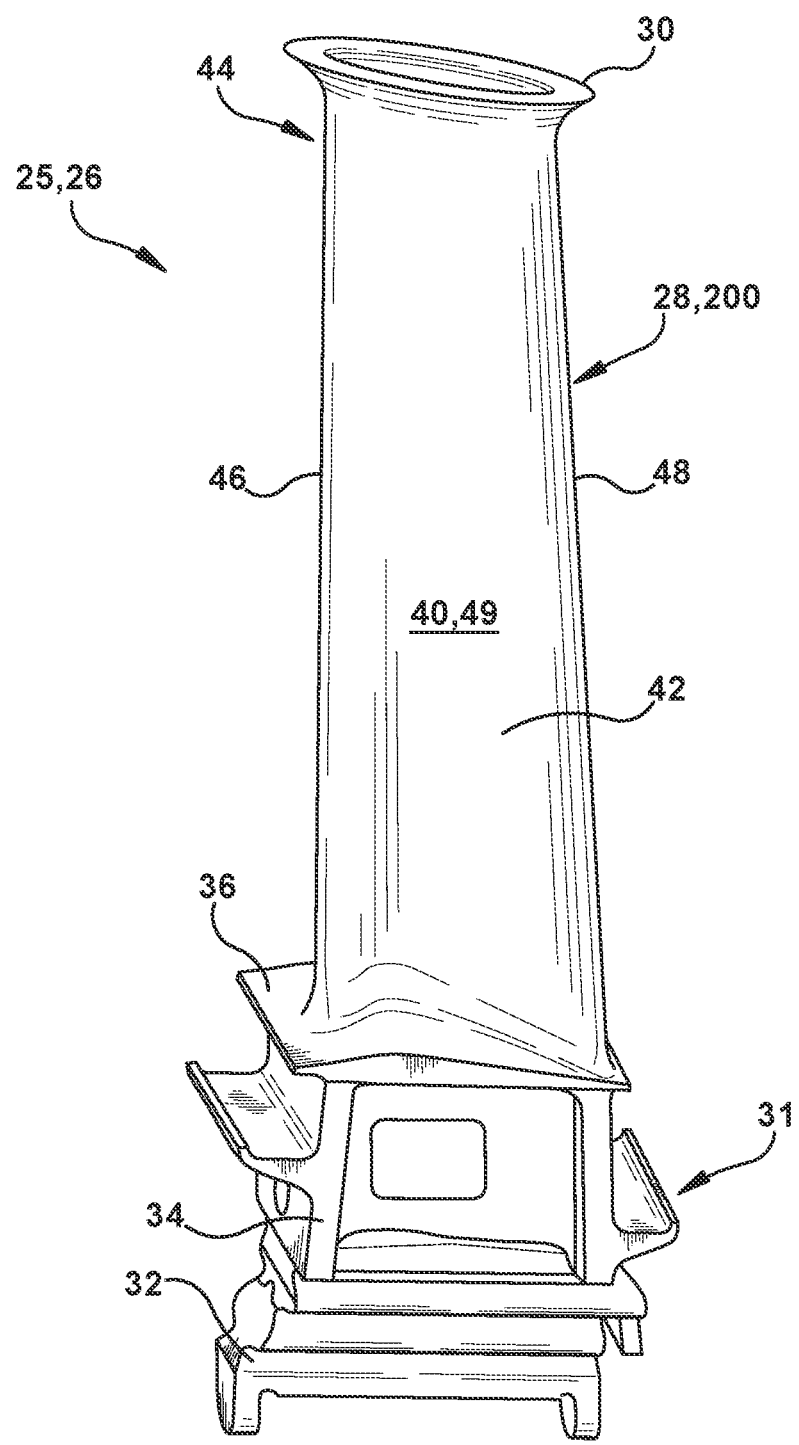
FIG. 4 is a perspective view of an illustrative turbomachine part in the form of a turbine rotor blade having a flared tip rail.

For background purposes, FIG. 4 provides a perspective view of an illustrative part 28 having an overhung section 30. For purposes of description, part 28 is illustrated as a flared tip turbomachine blade 25, and more particularly, a turbine rotor blade 26. It is noted that the teachings of the disclosure are also applicable to any part 28 with overhung section 30 other than a turbomachine blade 25, as described herein, such as any other hot gas path (HGP) part of gas turbine 10. The teachings of the disclosure are also applicable to other industrial parts having an overhung section.

Turbomachine blade 25 may include a root 31 that is configured for attaching to a rotor disc. Root 31, for example, may include a dovetail 32 configured for mounting in a corresponding dovetail slot in the perimeter of a rotor disc. Root 31 may further include a shank 34 that extends between dovetail 32 and a platform 36. Platform 36, as shown, generally forms the junction between root 31 and an airfoil 40, with the airfoil being the active component of turbine rotor blade 26 that intercepts the flow of working fluid through turbine 14 and induces the desired rotation. Platform 36 may define the inboard end of airfoil 40. Platform 36 also may define a section of the inboard boundary of the working fluid flowpath through turbine 14.

Airfoil 40 of the turbomachine blade typically includes a concave pressure face 42 and a circumferentially or laterally opposite convex suction face 44. Pressure face 42 and suction face 44 may extend axially between opposite leading and trailing edges 46, 48, respectively, and, in the radial direction, between an inboard end, which may be defined at the junction with platform 36, and an outboard tip, which may include a flared tip rail. Airfoil 40 may include a curved or contoured shape that is designed for promoting desired aerodynamic performance.

As used herein, turbomachine blade 25 and components thereof may be described according to orientation characteristics of turbine 14. It should be appreciated that, in such cases, turbomachine blade 25 is assumed to be properly installed within turbine 14. Such orientation characteristics may include radial, axial, and circumferential directions defined relative to central axis 18 (FIG. 1) of turbine 14. Forward and aft directions may be defined relative to a forward end of turbine 14, at where the working fluid enters turbine 14 from combustor 16, and an aft end of turbine 14, at where the working fluid exits turbine 14. A rotation direction may be defined relative to an expected direction of rotation of turbomachine blade 25 about central axis 18 (FIG. 1) of turbine 14 during operation.

As indicated above, the disclosure provides methods of forming or repairing part 28 with an overhung section 30, e.g., a flared tip of turbomachine blade 25. For repair purposes, the method may include removing a portion, and adding a section to the part. For purposes of initially forming part 28, the method may add a section to a portion of part 28 already formed. In any event, the section being added or formed includes the overhung section. The adding includes sequentially layering one or more pluralities of material layers on the part. When complete, the plurality of material layers approximates dimensions of the section including the overhung section. The sequential layering may include, for example, laser welding, cold metal transfer (CMT), tungsten inert gas (TIG) welding, laser sintering, direct metal laser melting (DMLM), net shape methods, near net shape methods, etc., and may be carried out in a number of ways that create varied layers within the section. The method and resulting part formed thereby may be formed by net shape methods that minimize or eliminate post build processing or finishing. The method may include machining the at least one plurality of material layers to form the section including the overhung section.

Figure 5:
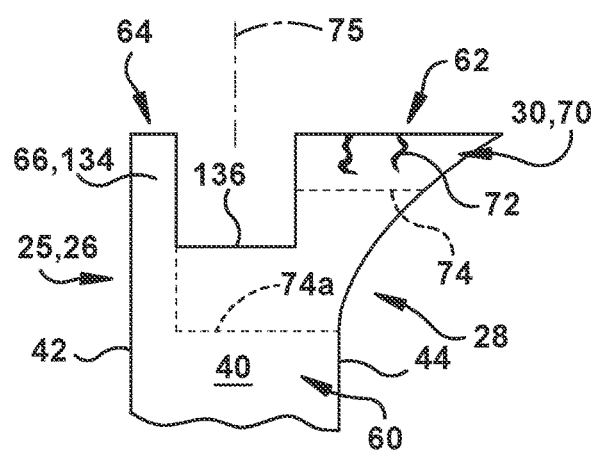
FIG. 5 shows a cross-sectional view of an illustrative overhung section in the form of flared tip rail including a portion to be removed and an intended removal line.

FIG. 5 shows an enlarged, cross-sectional view of a used part 28 having a body 60 having a first side 62 and an opposing, second side 64, according to embodiments of the disclosure. Body 60 may also have a longitudinal axis 75. Longitudinal axis may be any axis of reference of body 60, e.g., through a length thereof. In terms of an airfoil 40, the longitudinal axis may be a radial axis as the airfoil is positioned in gas turbine 10 (FIG. 1). Overhung section 30 extends in an overhung manner from, for example, first side 62 of body 60. Overhung section 30 lacks vertical structural support in a portion thereof. In one embodiment, overhung section 30 is opposite an opposing member 66 on second side 64 of body 60, and has more mass than opposing member 66. In the example shown, part 28 includes turbomachine blade 25 including a flared tip rail 70 that overhangs, for example, suction face 44 of the blade on first side 62. Hence, flared tip rail 70 is an example of an overhung section 30 (FIG. 4) of a part 28. Body 60 includes airfoil 40, and flared tip rail 70 is opposite an opposing member 66 in the form of a radially extending tip rail 134 extending from an end of airfoil 40. Flared tip rail 70 extends circumferentially relative to an axis 18 (FIG. 1) of gas turbine 10. In other embodiments, overhung section 30 may be opposite another overhung section, e.g., flared tip rail 70, that may or may not have different mass, and may extend around the periphery of airfoil 40—see e.g., FIGS. 23 and 24.

Figure 6:
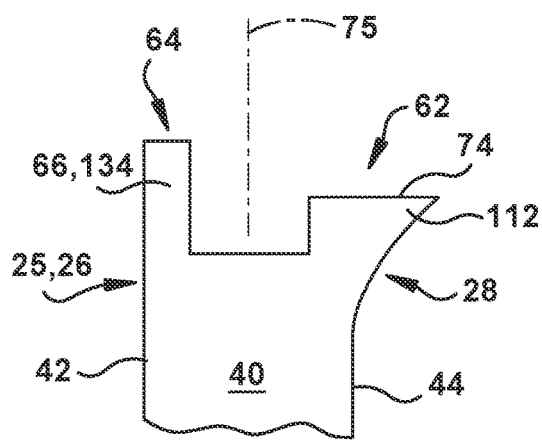
FIG. 6 shows a cross-sectional view of the part after removing the portion of FIG. 5, creating a surface upon which to build a new overhung section.

A damaged overhung portion may include overhung flared tip rail 70, i.e., an overhung flared tip rail lacking structural support. Portion 72 may include any structure that is desired to be removed, and may include a portion with no damage or a portion with a variety of damage such as but not limited to worn surfaces, cracks, openings, roughness, etc. In this situation, as shown in FIG. 6, portion 72 may be removed from part 28 to create a surface 74 on the part, e.g., on turbomachine blade 25. Portion 72 may also be defined by surface/line 74a, where the portion removed is deeper and extends to a non-flared section of suction face 44. Portion 72 may be removed using any now known or later developed technique including but not limited to: electric discharge machining (EDM), mechanical cutting/grinding, laser cutting, etc. As shown in FIG. 6, while some remnants of flared tip rail 70 may or may not remain, portion 72 is removed so as to form a surface 74 upon which the removed section can be reformed. Surface 74 may be flat, curved or have a three-dimensional shape or profile. As also shown in FIG. 6, in one embodiment, the angle of surface 74 can be a substantially horizontal plane, i.e., with body in a vertical position—longitudinal axis 75 vertical. As will be described herein, surface 74 may also be formed at a non-horizontal angle, and the part rotated as required to allow formation of new layers. In one non-limiting example, at most half of flared tip rail 70 is removed, e.g., based on at most half of portion 72 being removed. In another non-limiting example, more than half of flared tip rail 70 is removed, e.g., based on more than half of portion 72 being removed.

Embodiments of the disclosure may also include initial manufacture of flared tip rail 70. In this case, the starting structure, as shown in FIG. 6, may be manufactured using any appropriate technique for the material and structure being built. Non-limiting examples may include casting and additive manufacture. In any event, surface 74 upon which an overhung section is to be built, is generated.

Figure 7:
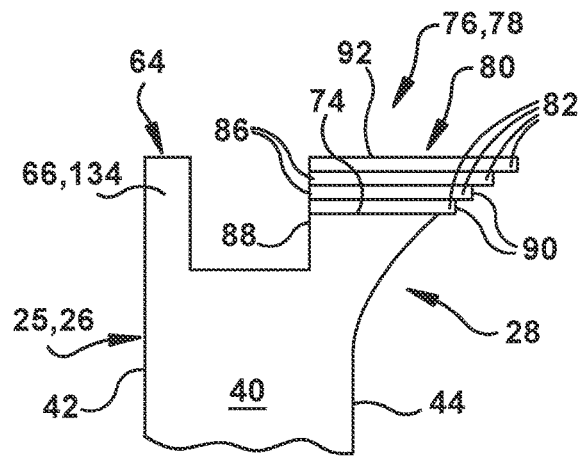
FIG. 7 shows a cross-sectional view of sequentially layering a plurality of material layers on the surface of the part.

FIG. 7 shows a cross-sectional view of adding a section 76 to part 28, where section 76 includes a new overhung section 78. The adding includes sequentially layering a plurality 80 of material layers 82 on part 28, i.e., on surface 74. Collectively, when complete, the plurality of material layers 82 approximates dimensions of the section including new overhung section 78. That is, the added section approximates dimensions of the desired new overhung section 78 being added, or portion 72 being replaced. As used herein, "approximate dimensions" generally indicates the new overhung section 78 can be formed by material removal with machining, and little or no additional material add. The adding of material layers 82 can be provided in a number of ways. For example, material layers 82 may be formed using laser welding, laser cladding, cold metal transfer (CMT), tungsten inert gas (TIG) welding, additive manufacturing, metal sintering, direct metal laser melting (DMLM), etc. In this case, as shown in the enlarged cross-sectional view of material layers 82 in FIG. 8, sequential layering of plurality 80 of material layers 82 on part 28 includes forming a series of weld beads 84 to form each layer 82. Any number of weld beads 84 may be used to form a single layer. The layers may be formed using the welding in any pattern, e.g., starting at a center or periphery and forming them in a continuous spiral weld bead, or forming individual linear weld beads side-by-side that extend from side to side of surface 74, or a combination thereof. Surface 74 may be positioned in a substantially horizontal position (e.g., no more than +/−3° from horizontal) during the sequential layering to foster even layering of material, and then portion 72 can be replaced by sequentially layering at least one plurality 80 of material layers 82 on surface 74.

In FIG. 7, only a single plurality 80 of material layers 82 is used. Here, a second end 90 of the plurality of material layers 82 is stair-stepped to approximate dimensions of the overhung section (to be formed). In one example, a first end 86 of a single plurality 80 of material layers 82 are illustrated as generally aligned with a surface 88 of part 28, and a second end 90 of single material layers 82 are stair-stepped to approximate dimensions of the overhung section (to be formed). Here, second ends 90 progressively extend to larger extents over suction face 44 of turbomachine blade 25 in an overhung fashion, moving upwardly as illustrated. Here, each layer 82 may have first ends 86 thereof radially or vertically aligned. It is noted that first ends 86 of the single plurality of material layers 82 may not be precisely aligned as illustrated, and may have uneven edges relative to surface 88 of part 28. These uneven edges may be later machined to be aligned with surface 88 of part 28.

Figure 9:
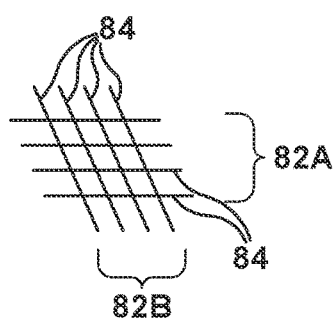
FIG. 9 shows a schematic plan view of series of weld beads of two layers of material extending in different directions.
Figure 10:
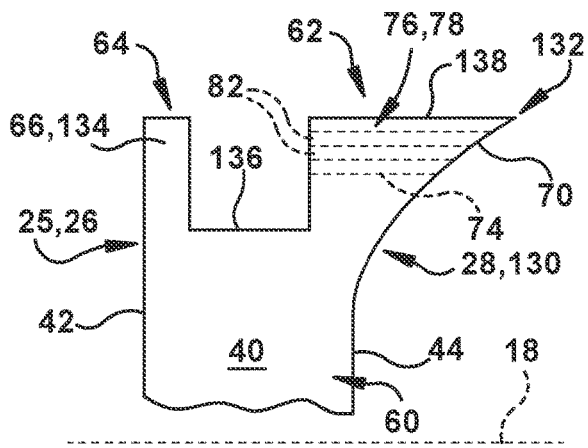
FIG. 10 shows a cross-sectional view of machining the part of FIG. 7 to form a new overhung section.

FIG. 9 shows a schematic plan view of weld beads 84 of layers 82. As illustrated, weld beads 84 of different layers 82A may be angled relative to weld beads 84 of other layers 82B. For example, series of weld beads 84 for at least one first material layer 82A of plurality 80 of material layers 82 may be formed at a non-parallel angle to the series of weld beads 84 for at least one second material layer 82B of the same plurality 80 of layers. Any angle may be employed to foster strength in the new section 76 (FIG. 10). In addition to the direction of weld beads, the sequential layering may be carried out in a manner to control a local temperature of the structure to prevent thermal cracking. For example, a user could jump from place-to-place on a build surface 74 to allow cooling in one area while working in another area, and ensuring a new weld bead is applied in a location that has cooled prior to application of the new weld bead.

FIG. 10 shows part 28 after machining plurality 80 of material layers 82 to form new section 76 including new overhung section 78. Where the process is replacing portion 72 (FIG. 5), overhung section 78 may match a shape and dimensions of portion 72 (FIG. 5). Alternatively, it may have a different shape and dimensions to provide improved performance and/or longevity. Machining may include any manner of material removal allowing blending of surfaces, resulting in the desired shape and dimension for new section 76. Non-limiting and non-comprehensive examples of machining may include: milling, grinding, cutting, polishing, etc. As noted, body 60 may include an airfoil 40 of turbomachine blade 25. In this case, overhung section 78 includes flared tip rail 70 extending from one of first side 62 (shown) and second side 64 of the airfoil 40. In FIG. 10, turbomachine blade 25 includes flared tip rail 70 extending from airfoil 40, with radially-facing outer surface 138 of overhung section 78 being parallel to axis 18 of the turbomachine.

Figure 25:
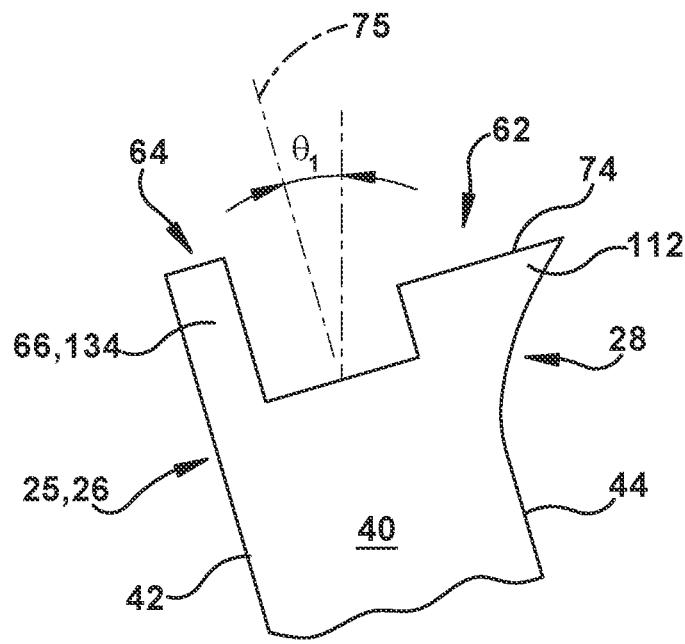
FIG. 25 shows a cross-sectional view of an illustrative overhung section in the form of flared tip rail having a portion removed and the part rotated by a predetermined angle to form an inclined build surface.
Figure 26:
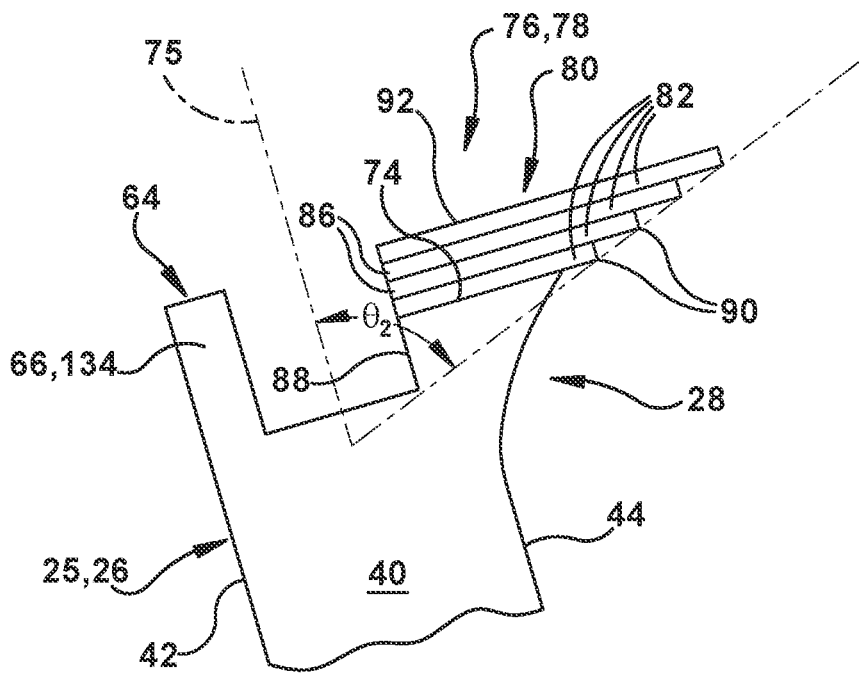
FIG. 26 shows a cross-sectional view of sequentially layering a plurality of material layers on the inclined surface of the part.

In FIG. 7, surface 74 is formed so as to be parallel to a radially-facing outer surface 92 of new section 76, e.g., perhaps extending parallel relative to axis 18 (FIG. 1) of gas turbine 10 (FIG. 1). In other words, surface 74 extends perpendicular to a longitudinal axis 75 of the part, or in terms of a turbomachine blade, a radial axis 75 of body 60 of airfoil 40. Consequently, part 28 includes at least a portion of overhung section 78 that includes a plurality 80 of material layers 82, where each material layer 82 extends at a perpendicular angle relative to a longitudinal axis 75 of body 60. The portion of overhung section 78 may include at most half of overhung section 78 extending from a floor surface 136 to a radially-facing outer surface (when blade mounted) of overhung section 78, or more than half of overhung section 78. In an alternative embodiment, as shown in FIG. 25, part 28 may be rotated so that surface 74 is inclined from horizontal. For example, the angle of rotation θ1 may be about 15° to about 60°, so that longitudinal axis 75 of part 28 is at angle of rotation θ1 from vertical. FIG. 26 shows a cross-sectional view of adding new section 76 to part 28, where new section 76 includes a new overhung section 78. The adding includes sequentially layering a plurality 80 of inclined material layers 82 on part 28, i.e., on inclined surface 74. Collectively, when complete, plurality 80 of material layers 82 approximates dimensions of new section 76 including overhung section 78 with a greater overhang angle than would be obtainable with a horizontal surface build as shown in FIG. 7. That is, the added section 76 approximates dimensions of the desired new overhung section 78 being added, or damaged section 72 (FIG. 5) being replaced, or if desired, with a greater overhang angle. For example, an overhang angle θ2 may be about 50° to about 65°, or about 55° to about 60°. The overhang angle θ2 is measured between the longitudinal axis 75 of the part and a line intersecting the bottom corners (or edge) of the overhanging material layers 82, as shown in FIG. 26. The inclined build reduces the perceived overhang of each layer, so that greater amounts of overhang may be successfully obtained.

Figure 11:
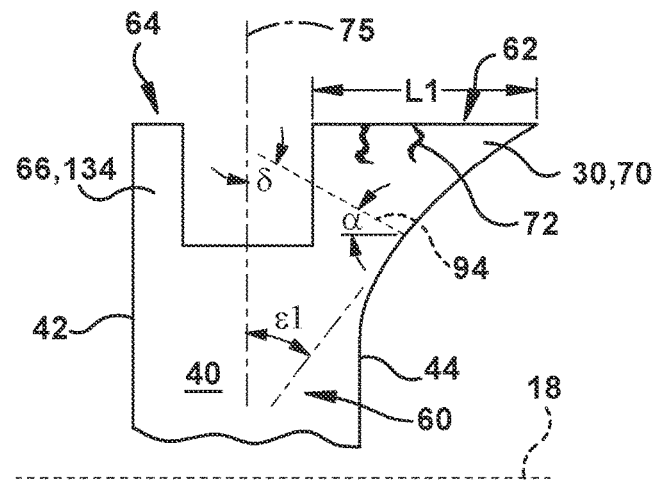
FIG. 11 shows a cross-sectional view of an overhung section in the form of flared tip rail including a portion to be removed and an intended removal line.
Figure 12:
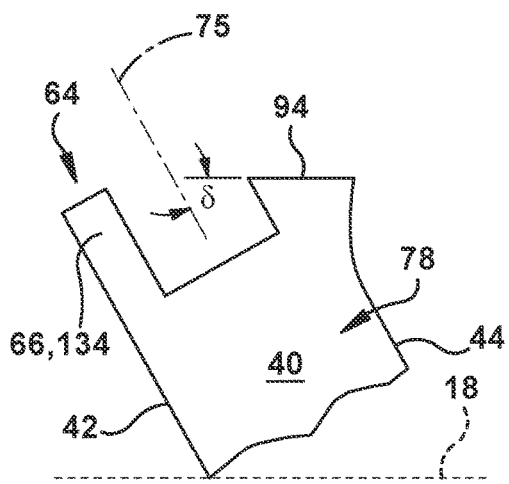
FIG. 12 shows a cross-sectional view of the part after removing the portion of FIG. 11 and rotating the part, creating a surface upon which to build a new overhung section.

As shown in FIG. 11, in alternative embodiments, removing portion 72 of part 28 may include creating a surface 94 that is not perpendicular to longitudinal axis 75 of body 60, i.e., a radial axis 75 of body 60 of airfoil 40. Rather, surface 94 may be at an acute angle δ relative to longitudinal axis 75 of body 60, i.e., a radial axis 75 of airfoil 40. To be clear, an acute angle is between 0° and 90°. Surface 94 may also be at an acute angle α relative to an axis 18 (added in phantom in FIG. 11) of gas turbine 10. Additionally, surface 94 will be at an angle that is neither perpendicular nor parallel to a target radially-facing outer planar surface 96 (FIG. 14) of new overhung section 78 of the final product, i.e., a new flared tip rail.

Figure 13A:
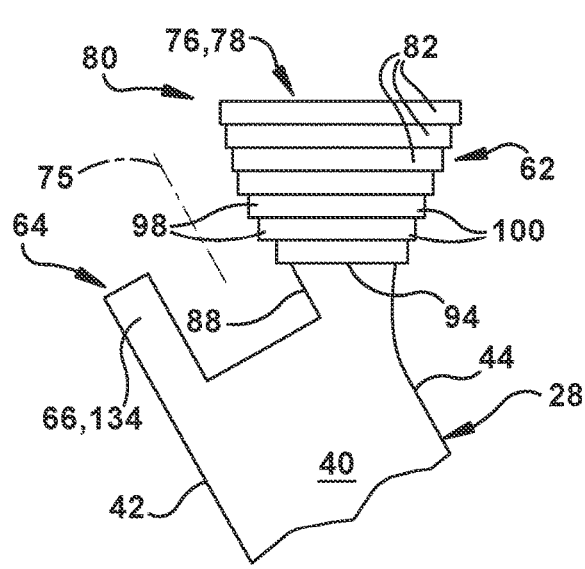
FIG. 13A shows a cross-sectional view of sequentially layering a plurality of material layers on the surface of the part of FIG. 12 in a substantially horizontal position.
Figure 13B:
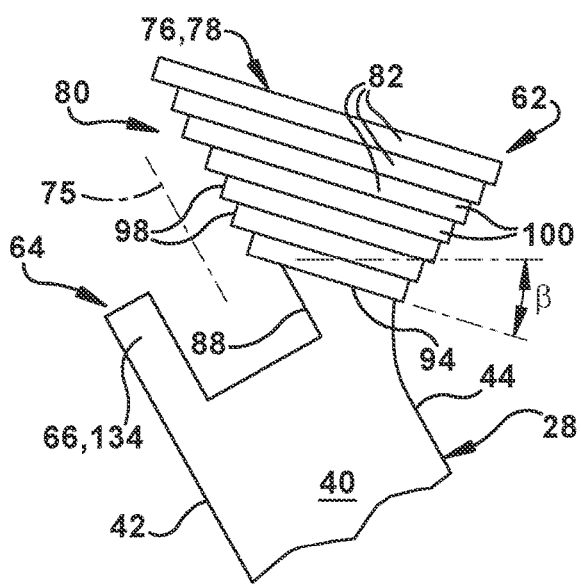
FIG. 13B shows a cross-sectional view of sequentially layering a plurality of material layers on the surface at a different rotated angle than FIG. 13A.

As shown in FIG. 13A, surface 94 may be rotated so as to be substantially horizontal (+/−3°) prior to sequentially layering plurality 80 of material layers 82 thereon. Alternatively, as shown in FIG. 13B, part 28 may be rotated to position surface 94 at angle β other than horizontal and vertical prior to sequentially layering plurality 80 of material layers 82. Part 28 may alternatively be rotated to the FIG. 13B position after a certain number of material layers 82 are sequentially layered. Angle β may be any angle that allows for the desired stepping of plurality 80 of material layers 82, i.e., that is not substantially horizontal as defined herein. For example, angle β may be such that ends 98 of layers 82 step outwardly in a manner that allows later machining of the ends to be aligned with surface 88, and such that ends 100 of layers 82 step outwardly in a manner that forms new overhung section 78 of part 28. Angle β may allow formation of overhung section 78 with an extent that could not be created if surface 94 was horizontal. For example, an outward length L2 (FIG. 14) of new overhung section 78 could be greater than an initial outward length L1 (FIG. 11) of original overhung section 30, or an angle ε2 of new overhang section 78 relative to radial axis 75 of body 60 may be greater than an initial angle ε1 (FIG. 11) of original overhang section 30 relative to radial axis 75 of body 60. Angle β may be any angle that allows for the sequential layering without allowing undesired forming of the layers, e.g., in the form of dripping, slumping or breaking.

FIGS. 13A-B also show sequentially layering plurality 80 of layers 82 on surface 94. In this case, each end 98, 100 of layers 82 may be stair-stepped. That is, as shown in FIGS. 13A-B, the sequential layering of plurality 80 of material layers 82 may include forming a first end 98 of the plurality of material layers in a stair-stepped manner from a first side of the surface 94, and a second end 100 of plurality 80 of material layers 82 in a stair-stepped manner from a second side of the surface 94. One of the first end and the second ends (100 as shown) approximates dimensions of section 76 including overhung section 78, as described herein. Ends 98 may be stair-stepped so as to be aligned with surface 88 of part 28, when finished, and as noted, ends 100 may be stair-stepped so as to form new overhung section 78 of part 28, e.g., a new flared tip rail for turbomachine blade 25. Here, as shown in phantom in FIG. 14, after machining, layers 82 in new overhung section 78 of the finished product extend at acute angle α relative to axis 18 (shown schematically in phantom) of gas turbine 10 (FIG. 1), at acute angle α relative to target outer surface 96 (FIG. 14), and at an acute angle δ relative to longitudinal axis 75 of body 60 or part 28 (i.e., radial axis 75 of airfoil 40). In addition, target outer surface 96, when complete, is at angle α relative to plurality 80 of material layers 82 and surface 94 upon which the layers are built. It is to be understood that while target surface 96 is shown as planar, it may also not be a planar surface; for example, surface 96 could be curved or have a three-dimensional profile.

Figure 14:
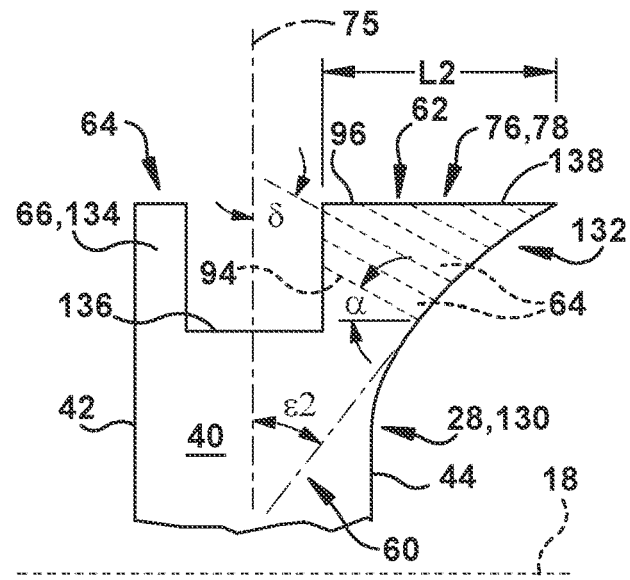
FIG. 14 shows as cross-sectional view of machining the part of FIGS. 13A-B to form a new overhung section.
Figure 23:
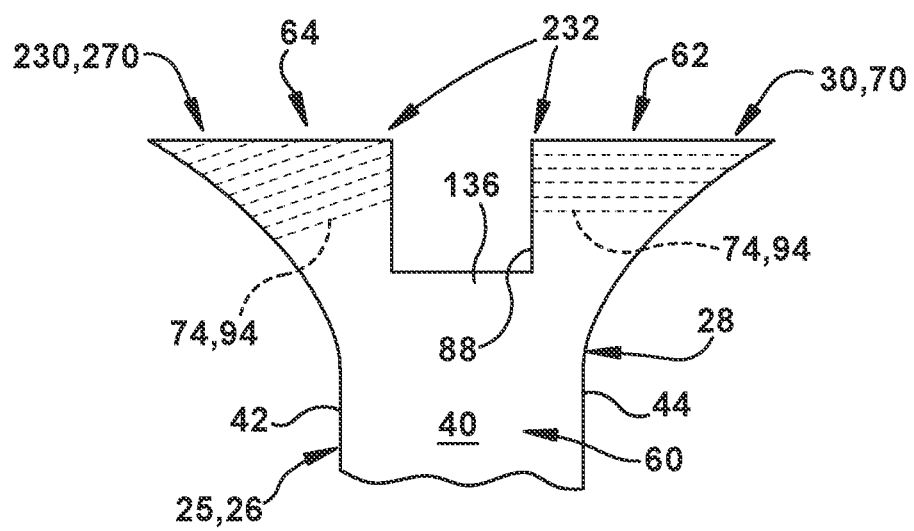
FIG. 23 shows a cross-sectional view of a pair of overhung sections in an illustrative part in the form of a double flared tip rail including portions to be removed and intended removal lines.

FIG. 14 shows machining plurality 80 of material layers 82 to form overhung section 78 and target outer planar surface 138. Target outer (planar) surface 96 is at angle α relative to plurality 80 of material layers 82. Turbomachine part 28, shown in FIG. 14, includes body 60 having a first side 62, a second side 64 which may be opposed first side 62, and a longitudinal axis 75. Overhung section 76 extends in an overhung manner from at least one of first side 62 (shown) and second side 64 of body 60. FIG. 23 shows overhung sections extending from both sides. As noted in FIG. 14, at least a portion of overhung section 78 includes a plurality 80 of material layers 82, where each material layer 82 extends at an acute angle δ relative to longitudinal axis 75 of body 60. In one embodiment, a radially extending tip rail 134 may extend from the airfoil 40 (from the other side of body 60), and radially-facing outer surface 138 of the overhung section 78 may be parallel to axis 18 of the turbomachine, when in an operative position.

Referring to FIGS. 15-22, in another embodiment of the disclosure, more than one plurality of material layers 82 may be used to form new section 76 including new overhung section 78. Here, a section 76 may be added to part 28, including overhung section 78 by sequential layering more than one plurality of material layers. The method may include sequentially layering a first plurality of material layers on the part extending in a first direction, and sequentially layering a second plurality of material layers on the part extending in a second direction different than the first direction, e.g., two pluralities of layers built on perpendicular surfaces formed on the part. The second plurality of material layers generally meets with the first plurality of material layers, i.e., to form new section 76. The different layers of each plurality of layers can vary in material, e.g., material layers may alternate material within a given plurality of layers. In addition or alternatively, the material within each plurality of layers may be the same, but the two pluralities of layers may use different material. Either or both pluralities of material layers 82 may use the same or different material than body 60.

Figure 15:
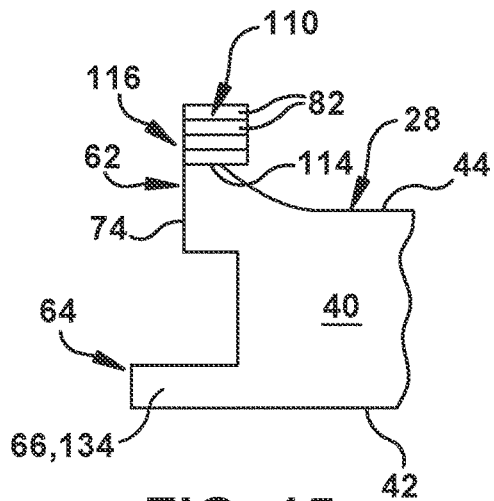
FIG. 15 shows a cross-sectional view of sequentially layering a first plurality of material layers on a first surface of the part in FIG. 6 in a first direction.
Figure 16:
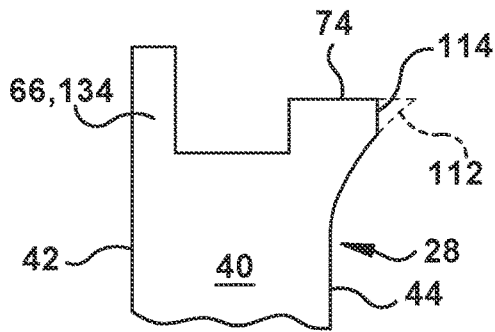
FIG. 16 shows a cross-sectional view of the part after removing the portion of FIG. 6, and optionally creating two surfaces upon which to build the new overhung section.

As shown in FIGS. 6 and 15, if applied to a used part, any portion 72 of part 28 may be removed, creating surface 74. Otherwise, formation of new section 76 may be from a part initially formed, as shown in FIG. 6. In one embodiment, as shown in FIG. 15, adding section 76 to part 28 including overhung section 78 may include sequential layering a first plurality 110 of material layers 82 on part 28 extending in a first direction, e.g., generally horizontal as shown but perhaps with some angle departing from horizontal. In this example, first plurality 110 of layers 82 may be sequentially formed horizontally on part 28 in a manner that consumes a portion 112 (FIG. 6) of flared tip rail 70. Alternatively, as shown in FIG. 16, prior to the first sequential layering, any material desired, such as portion 112 (shown in phantom) of flared tip rail 70 (FIG. 6), may be removed to form another surface 114. That is, another portion 112 of part 28 is removed to create another surface 114. In this case, after any necessary rotation, layers 82 may be sequentially formed horizontally on part 28 on surface 114, i.e., not consuming any other material. In this setting, sequential layering of first plurality 110 of material layers 82 is on surface 114 and forms an extension 116 of surface 114. Ends 118 of layers 82 are ideally aligned with surface 74 when formed, but where they are not aligned, they may be machined to be aligned with surface 74. In FIG. 15, sequential layering of first plurality 110 of material layers 82 creates extension 116 of surface 74. As will be described herein, alternative embodiments may form the extension with a stair-stepped end—see e.g., FIGS. 18C and 19.

Figure 17:
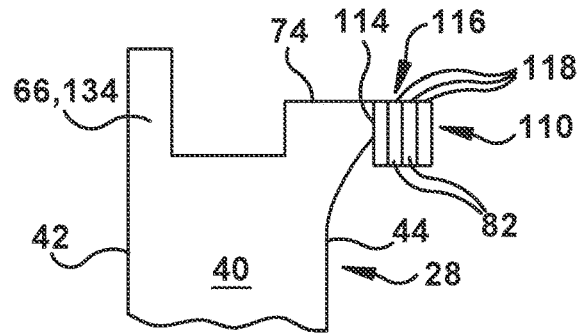
FIG. 17 shows a cross-sectional view of the part after rotating the part and layering a first plurality of material layers.
Figure 18A:
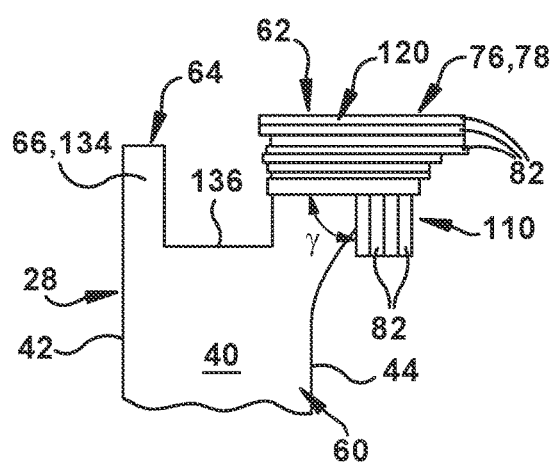
FIG. 18A shows a cross-sectional view of sequentially layering a second plurality of material layers on a second surface of the part in a second direction.

FIG. 17 shows rotating part 28 such that surface 74 is at a different angle, e.g., substantially horizontal, and FIG. 18A shows sequentially layering a second plurality 120 of material layers 82 on part 28 extending in a second, different direction, e.g., perpendicular to first plurality 110 of material layers 82. In this embodiment, as noted, sequential layering of first plurality 110 of material layers 82 creates extension 116 of surface 74, and as shown in FIG. 18A, sequential layering of a second plurality 120 of material layers 82 is on first surface 74 and extension 116 of first surface 74. Second plurality 120 of material layers 82 meet with first plurality 110 of material layers 82, i.e., generally they come together and mate or generally mate together.

Figure 18B:
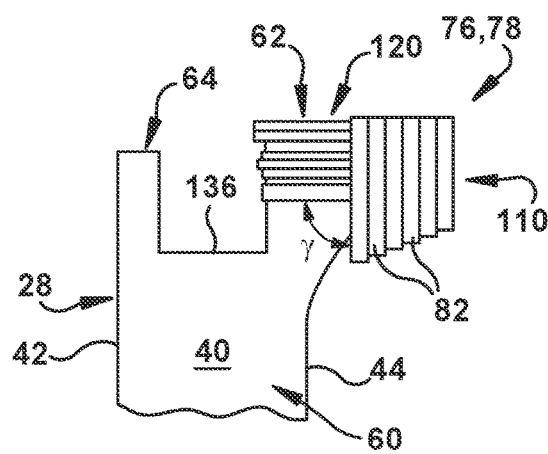
FIG. 18B shows a cross-sectional view of sequentially layering a second plurality of material layers on a second surface of the part in a second direction.

FIGS. 18A-18E show various embodiments that result in first plurality 110 of material layers 82 and second plurality 120 of material layers 82 collectively approximating the dimensions of new section 76 including new overhung section 78, and being non-coplanar relative to one another. As will be described, the second plurality 120 of material layers 82 can extend in a variety of non-coplanar directions (i.e., not in the same plane) relative to the first direction of first plurality 110 of material layers 82. FIGS. 17 and 18A show an embodiment in which the eventual horizontal second plurality 120 of material layers 82 extends over vertical first plurality 110 of material layers 82, i.e., with angle γ between surfaces 74, 114 substantially perpendicular (90°+/−2°). FIG. 18B shows an alternative embodiment in which plurality 110, 120 of material layers are reversed in position. That is, second plurality 120 of material layers 82 is formed first on surface 74 and provides extension 116. Then, part 28 is rotated to have surface 114 and extension 116 available to be built on, and first plurality 110 of material layers 82 is formed. First plurality 110 of material layers 182 ends up extending adjacent ends of second plurality 120 of material layers 82 that form extension 116.

Figure 18C:
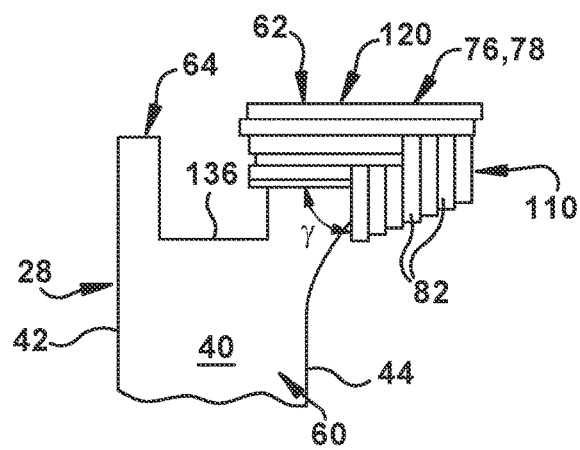
FIG. 18C shows a cross-sectional view of the part after repeating sequential layering first and second pluralities of material layers on the part between rotations of the part.

FIG. 18C shows another alternative embodiment of the part after repeating the sequentially layering of each plurality. In other words, less than all material layers 82 of first and second pluralities 110, 120 of material layers 82 are formed on the part between rotations of the part. Here, some number of layers, e.g., 1-4, less than all layers of first or second plurality 110, 120 of material layers 82 are built on one surface 74, 114; the part is then rotated, and another number of layers, e.g., 1-4, less than all of the other plurality 110, 120 of material layers 82, is built on the opposing surface 74, 114. This approach creates a stair-stepped mating or generally stair-stepped mating of groups of layers 82 within each plurality 110, 120. This process may be advantageous for reducing thermal stress, and to address other mechanical issues.

Figure 18D:
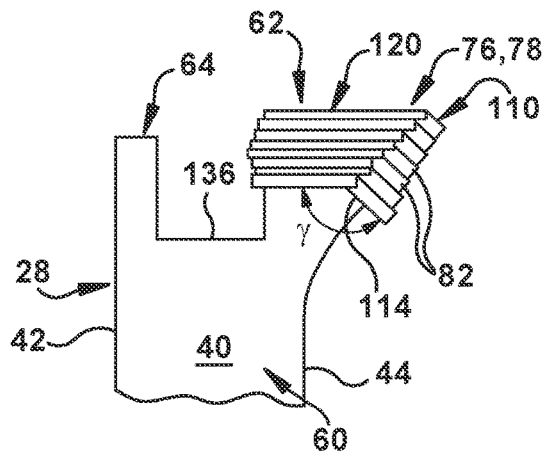
FIG. 18D shows a cross-sectional view of sequentially layering pluralities of material layers at a non-perpendicular angle on the part.
Figure 18E:
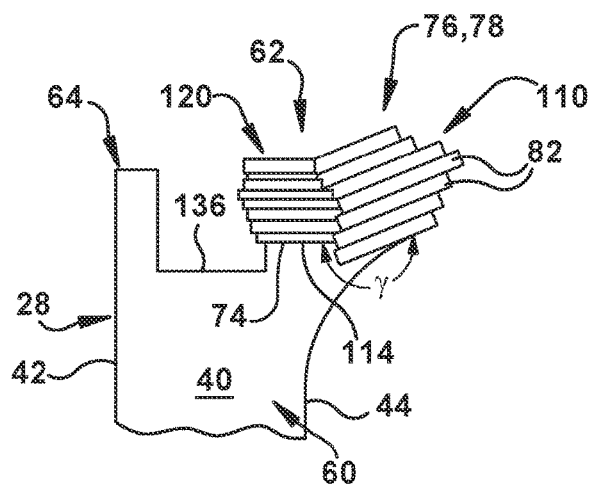
FIG. 18E shows a cross-sectional view of sequentially layering pluralities of material layers at a non-perpendicular angle on the part.

FIGS. 18D-E show other alternative embodiments of the part in which surfaces 74 and 114 are formed in non-coplanar directions and have a non-perpendicular (90°) angle γ. Here, the positioning of surfaces 74 or 114 during layering of respective pluralities 110, 120 of material layers 82 can be at any position necessary to ensure the desired joining of layers and accommodate hardware welding constraints. FIG. 18D shows surfaces 74, 114 at an obtuse angle γ (90°<γ<180°), and FIG. 18E shows surfaces 74, 114 at an angle γ that is greater than 180°.

Figure 19:
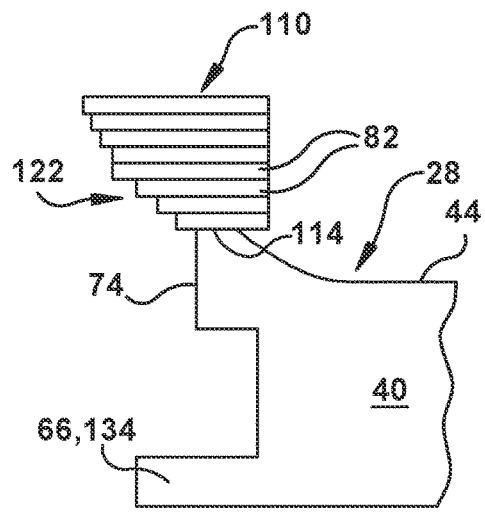
FIG. 19 shows a cross-sectional view of sequentially layering a first plurality of material layers on a first surface of the part in a first direction, creating a stepped extension.
Figure 20:
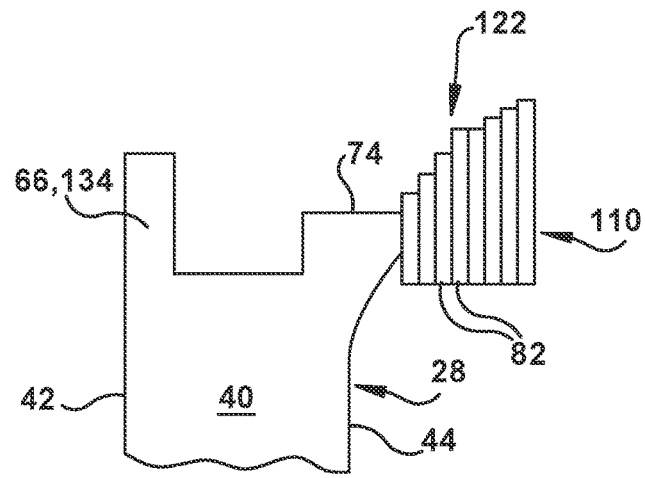
FIG. 20 shows a cross-sectional view of the part of FIG. 19 after rotating the part.
Figure 21:
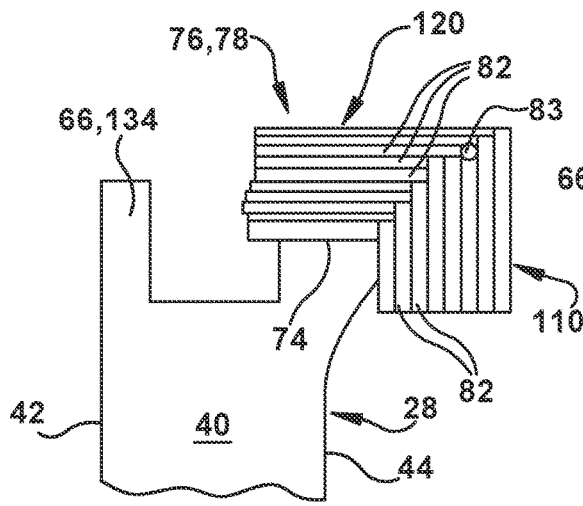
FIG. 21 shows a cross-sectional view of sequentially layering a second plurality of material layers on a second surface of the part of FIG. 20 in a second direction.

FIGS. 19-21 show an alternative embodiment that is substantially similar to that described relative to FIGS. 15-18E, except sequential layering of the first and second plurality 110, 120 of material layers 82 each create stair-stepped ends that generally meet with one another. As with FIGS. 15 and 16, the first sequential layering may consume portion 112 of the part, or another surface 114 can be created by removing portion 112 of the part and the layering completed on the surface. In any event, prior to the layering, for used part applications, any portion 72 of part 28 may be removed to create surface 74, 114.

FIG. 19 shows sequential layering of first plurality 110 of material layers 82 to create a stair-stepped extension 122 of surface 114. FIG. 20 shows any necessary rotating of the part, and FIG. 21 shows sequential layering of second plurality 120 of material layers 82 on surface 74 and stair-stepped extension 122 (FIG. 20) of surface 74. More particularly, sequential layering of second plurality 120 of material layers 82 on surface 74 is carried out to generally mate material layers 82 thereof with stair-stepped extension 122 of surface 74 formed by first plurality 110 of material layers 82, creating an interlocked bond. Here, as shown in FIG. 21, the two pluralities 110, 120 of material layers 82 may have mating stair-stepped ends, or have generally mating stair-stepped ends with perhaps some voids 83 therebetween at some locations. That is, ends of first plurality 110 of material layers 82 meet ends of second plurality 120 of material layers 82 in a stair-stepped fashion, perhaps with some voids 83 therein. While surfaces 74, 114 are shown as perpendicular to one another in FIGS. 19-22, any of the angles γ described relative to FIGS. 18A-E may be employed with the stair-stepped layers.

Figure 22:
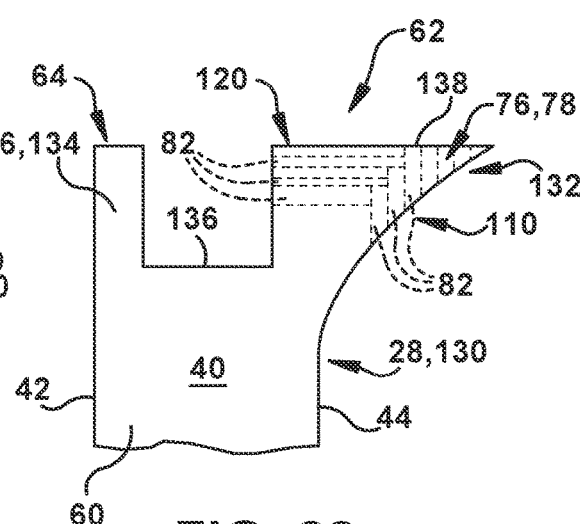
FIG. 22 shows as cross-sectional view of machining the part of FIG. 21 to form a new overhung section.

FIG. 22 shows part 28 after machining pluralities 110, 120 of material layers 82 to form section 76 including new overhung section 78. This process can follow any of the described processes of sequentially layering more than one plurality of material layers. This machining process may be as described relative to FIG. 10. While the machining is shown carried out from the FIG. 21 embodiment, it will be recognized that similar machining may be performed on the FIGS. 18A-E embodiments.

FIG. 22 illustrates a turbomachine part 28 including body 60 having first side 62 and second side 64. Overhung section 78 extends in an overhung manner from at least one of first side 62 and second side 64 (shown) of body 60. At least a portion of overhung section 78 includes a first plurality 110 of material layers 82 extending in a first direction, and a second plurality 120 of material layers 82 extending in a second direction at a non-coplanar direction (see angle γ) relative to the first direction of first plurality 110 of material layers 82—see FIGS. 18A-E.

FIG. 23 shows an enlarged, cross-sectional view of a part 28 having a body 60 having a first side 62 and an opposing, second side 64, according to other embodiments of the disclosure. Here, overhung sections 30, 230 extend in an overhung manner from first side 62 of body 60 and from second side 64 of body, respectively. Overhung sections 30, 230 both lack vertical structural support in a portion thereof. In this embodiment, overhung sections 30, 230 may have the same mass and extend to the same extent, or one or the other may have more mass and extend to a different extent. In the example shown, part 28 includes turbomachine blade 25 including a flared tip rail 70, 270 that overhangs, for example, suction face 44 and pressure face 42 of the blade. It is noted, however, that flared tip rail 70 may extend around an entire periphery of a tip of airfoil 40. Hence, flared tip rail 70 is an example of an overhung section 30, 230 of a part 28. Body 60 includes airfoil 40, and flared tip rail 70. Flared tip rail 70 extends circumferentially relative to an axis 18 (FIG. 1) of gas turbine 10. While FIGS. 5-22 show a process for repairing flared tip rail 70 on one side of airfoil 40, it will be readily recognized that the teachings of the disclosure can be repeated as many times and with as many build surfaces 74, 94, 114, 116, as necessary. Any number of portions 72 (damaged overhung portions) may be repaired or added.

Figure 24:
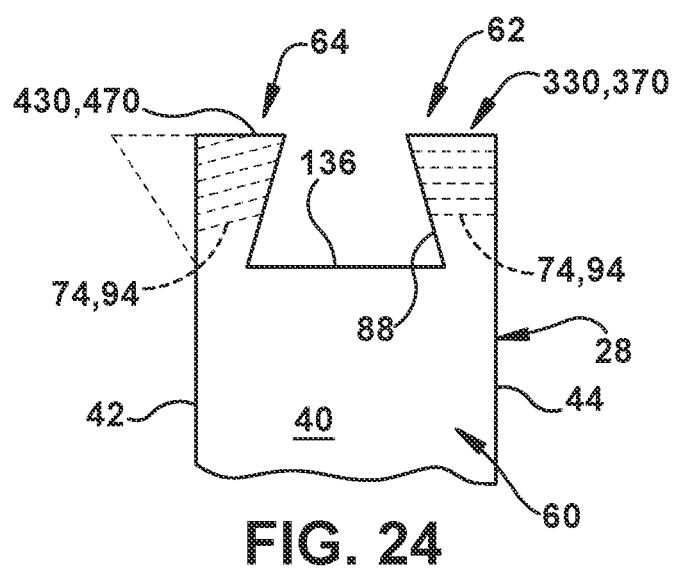
FIG. 24 shows a cross-sectional view an illustrative overhung section in the form of double flared tip rail that extends inwardly.

FIG. 24 shows an enlarged, cross-sectional view of a part 28 having a body 60 having a first side 62 and an opposing, second side 64, according to other embodiments of the disclosure. In FIGS. 5-23, overhung section(s) 30, 230 extended outwardly relative to body 60 of airfoil 40. In FIG. 24, overhung sections 330, 430 extend in an overhung manner inwardly from first side 62 of body 60 and from second side 64 of body, respectively. Overhung sections 330, 430 both lack vertical structural support in a portion thereof. In this embodiment, overhung sections 330, 430 may have the same mass and extend to the same extent inwardly, or one or the other section may have more mass and extend to a different extent. While not shown, it will be recognized that one of inwardly extending overhung sections 330, 430 may be replaced with a radially extending tip rail 134, such as in FIG. 5. Overhung sections 330, 430 may be repaired or added according to any of the embodiments described herein. It is to be understood that the overhung sections may extend over pressure face 42, suction face 44 and floor surface 136, or all of these surfaces/faces or combinations thereof.

Part 28 may include a metal. In one embodiment, part 28 is made of metal such as a metal or metal alloy, such as a superalloy with a columnar grain structure (e.g., directionally solidified (DS) blades). In one embodiment, part 28 may be made of a first metal, which may include a pure metal or an alloy. As used herein, "superalloy" refers to an alloy having numerous excellent physical characteristics compared to conventional alloys, such as but not limited to: high mechanical strength, high thermal creep deformation resistance, like Rene N5, Rene N500, Rene 108, CM247, Haynes alloys, Inconel, MP98T, TMS alloys, CMSX single crystal alloys. In one embodiment, superalloys for which teachings of the disclosure may be especially advantageous are those superalloys having a high gamma prime (γ') value. "Gamma prime" (γ') is the primary strengthening phase in nickel-based alloys. Example high gamma prime superalloys include but are not limited to. Rene 108, N4, N5, N500, GTD 444, MarM 247 and IN 738. New section 76 and plurality 80, 110, 120 of material layers 82 may include the first metal, creating turbomachine blade 25 with all of the same material. In an alternative embodiment, section 76 may include a second, different metal than the first metal. In one embodiment, all of layers 82 of a particular plurality 80, 110, 120 of layers 82 may be the same material, but a different material than the rest of part 28. That is, part 28 includes a first metal, and plurality(ies) 80, 110, 120 of material layers 82 includes a second, different metal than the first metal. Hence, new section 76 may be of a uniform material. Alternatively, different layers 82 of a plurality 80, 110, 120 of material layers 82 may be different, resulting in new section 76 having different materials therein. That is, plurality 80, 110, 120 of material layers 82 may include at least one first material layer including a first metal, and at least one second material layer including a second, different metal than the first metal. For example, material layers 82 of new section 76 near, for example, surface 74 or surface 114, may match the material of part 28, and layers away from surface 74 or surface 94 may be of a different material, e.g., harder to withstand more wear. Alternatively, different pluralities of layers may have different materials therewithin. That is, wherein at least one plurality 80, 110, 120 of material layers 82 may include at least one first material layer including a first metal, and at least one second material layer may include a second, different metal than the first metal. FIGS. 10, 14 and 22 show material layers in phantom.

With reference to FIGS. 4, 10, 14, and 22, embodiments of the disclosure also include a turbomachine part 130 for gas turbine 10 (FIG. 1). Turbomachine part 130 may include a turbomachine blade 25 including, as shown in FIGS. 4 and 5, body 60 in the form of airfoil 40 having a first side 62 in the form of suction face 44, and a second side 64 in the form of pressure face 42. Turbomachine part 130 in the form of turbomachine blade 25 may also include root 31 (FIG. 4). As shown in FIGS. 10, 14 and 22, turbomachine part 130 may also include new overhung section 78 in the form of a flared tip rail 132 extending in an overhung manner from at least one of first side 62 and second side 64 of body 60, i.e., from at least one of pressure face 42 and suction face 44 (latter shown) of airfoil 40. As shown in FIG. 14, overhung section 78 in the form of new flared tip rail 132 may be opposite an opposing member 66 on second side 64 of body 60 in the form of radially extending tip rail 134. Overhung section 78 and opposing member 66 extend from floor surface 136 of the body, e.g., an outer radial surface of airfoil 40. Overhung section 30 may have more mass than opposing member 66. As shown in FIG. 23, overhung sections 30, 230 in the form of new flared tip rail 232 may be formed on body 60. It is emphasized that each overhung section 30, 230 in FIG. 23 may take the form of any of the embodiments described herein. As shown in FIG. 24, overhung sections 330, 430 in the form of new inwardly extending flared tip rail(s) may also be formed on body 60. In any event, the overhung sections extend from floor surface 136. i.e., outer radial surface of airfoil 40. Overhung section 30, 230, 330, 430 may have the same or different masses and may extend to the same or different extents. In any event, overhung sections 30, 230, 330, 430 extend circumferentially relative to axis 18 (FIG. 1) of the turbomachine. It is also noted that overhung sections 30, 230, 330, 430 may take the form of a single unitary overhung section that extends about an entire periphery of airfoil 40.

As described herein, overhung section 30, 230, 330, 430 in the form of flared tip rail 132 includes at least one plurality 80 of material layers 82 therein. In one embodiment, the plurality of layers 82 are positioned in at most half of the overhung section extending from floor surface 136 to radially-facing outer surface 201, i.e., based on at most half of portion 72 being removed. As shown in FIG. 14, in one embodiment, each material layer 82 may extend at an acute angle δ relative to a radial axis 75 of body 60, and at an acute angle α relative to radially-facing outer surface 138 of overhung section 30, i.e., a radially-facing outer surface of flared tip rail 132. In this setting, surface 94 upon which plurality 80 of material layers 82 of new flared tip rail 132 were formed may also extend at an acute angle α relative to axis 18 (FIG. 1) of gas turbine 10 with the turbomachine blade 26 and radial axis 75 of body 60, in an operative position in the turbomachine. In another embodiment, shown in FIG. 22, flared tip rail 132 may include a first plurality 110 of material layers 82 therein extending in a first direction and a second plurality 120 of material layers 82 extending in a second direction at a non-coplanar direction (not 180°) to the first direction of first plurality 110 of material layers 82. The two plurality of layers may abut (FIGS. 18A-B), have mating stair-stepped ends (FIG. 22), or have generally mating stair-stepped ends (FIG. 21) with perhaps some voids 83 therebetween at some locations. In one embodiment, one of two pluralities 120 of material layers 82 may be substantially parallel to axis 18 (FIG. 1) of gas turbine 10 (FIG. 1) with turbomachine part 130 in an operative position in the turbomachine (perpendicular to radial axis 75). Further, the other of the two pluralities 110 of material layers 82 may extend in a non-coplanar direction relative to the plurality 120 of material layers 82. As illustrated in FIGS. 18A-C, the non-coplanar direction may be substantially perpendicular, i.e., 90°+/−2°. FIGS. 18D-E show other non-coplanar directions that are not substantially perpendicular, i.e., not at 90°+/−2°.

Body 60 in the form of airfoil 40 may include a first metal, and at least one of the plurality of material layers 82 may include a second, different metal than the first metal. In other embodiments, plurality 80, 110, 120 of material layers 82 may include at least one first material layer therein including a first metal, and at least one second material layer therein including a second, different metal than the first metal. That is, each different material may be used within a given plurality of material layers. For example, layers 82 of new section 76 near surface 74 may match the material of part 28, and layers away from surface 74 may be of a different material, e.g., harder to withstand more wear.

Figure 8:
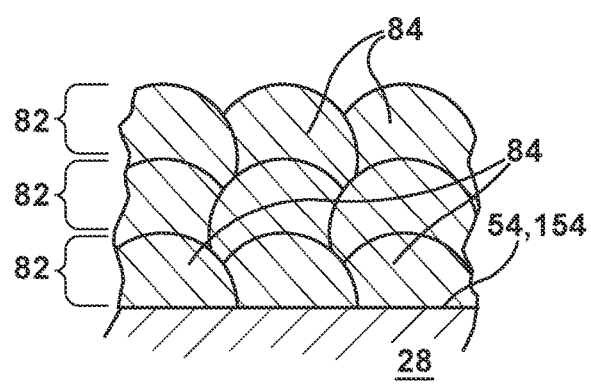
FIG. 8 shows an enlarged cross-sectional view of a plurality of material layers each made of a series of weld beads.

As shown in FIG. 8, each material layer 82 may include a series of weld beads 84. As shown in FIG. 9, the series of weld beads 84 for at least one first material layer 82A of the plurality of material layers may be at non-parallel angles to the series of weld beads 84 for at least one second material layer 82B of the plurality of material layers.

Embodiments of the disclosure provide several methods for creating material layers for material addition and/or repair of overhung sections such as flared tip rails on turbine rotor blades. Flared tip rails can be machined to have the desired dimensions, shape, etc., post-operation to maintain engine performance.

The foregoing drawings show some of the processing associated according to several embodiments of this disclosure. In this regard, each drawing represents a process associated with embodiments of the method described. It should also be noted that in some alternative implementations, the acts noted in the drawings may occur out of the order noted in the figure or, for example, may in fact be executed substantially concurrently or in the reverse order, depending upon the act involved. Also, one of ordinary skill in the art will recognize that additional processes that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A method, comprising:
removing a portion of a part to create a first surface;
adding a section to the part, the section including an overhung section that lacks structural support in a portion thereof, the adding including:
positioning a second surface of the part substantially horizontal;
sequentially layering a first plurality of material layers on the second surface extending in a first direction, wherein the sequential layering of the first plurality of material layers creates an extension of the first surface;
rotating the part to position the first surface of the part substantially horizontal; and
sequentially layering a second plurality of material layers on the first surface of the part and the extension thereof extending in a second direction, different from the first direction, the second plurality of material layers meeting with the first plurality of material layers,
wherein the first plurality of material layers and the second plurality of material layers collectively approximate dimensions of the section including the overhung section and are non-coplanar relative to one another; and
machining the first plurality of material layers and the second plurality of material layers to form the section including the overhung section.

2. The method of claim 1, wherein the part includes a first metal, and at least one material layer of at least one of the first plurality of material layers and the second plurality of material layers includes a second, different metal than the first metal.

3. The method of claim 1, wherein at least one of the first plurality of material layers and the second plurality of material layers includes at least one first material layer including a first metal, and at least one second material layer including a second, different metal than the first metal.

4. The method of claim 1, wherein the sequential layering of the first plurality of material layers and the second plurality of material layers on the part includes forming a series of weld beads to form each material layer.

5. The method of claim 4, wherein the series of weld beads for at least one first material layer of at least one of the first plurality of material layers and the second plurality of material layers is at a non-parallel angle to the series of weld beads for at least one second material layer of at least one of the first plurality of material layers and the second plurality of material layers.

6. The method of claim 1, further comprising, prior to the sequential layering:
   removing another portion of the part to create the second surface.

7. The method of claim 6, wherein a material layer of the first and second plurality of material layers extends to a larger extent relative to a previous material layer such that the first and second plurality of material layers form mating stair-stepped ends.

8. The method of claim 1,
   wherein the extension of the first surface is a stair-stepped extension of the first surface, and the sequential layering of the second plurality of material layers is on the first surface and the stair-stepped extension of the first surface.

9. The method of claim 8, further comprising removing another portion of the part to create the second surface.

10. The method of claim 1, wherein sequentially layering the first plurality of material layers and the second plurality of material layers includes:
    repeating the rotating the part to position the second surface substantially horizontal;
    repeating the sequential layering of the first plurality of material layers on the second surface;
    repeating the rotating the part to position the first surface substantially horizontal; and
    repeating the sequential layering of the second plurality of material layers on the first surface.

11. The method of claim 1, wherein the part includes a turbomachine blade of a turbomachine, and the overhung section includes a flared tip rail extending circumferentially relative to an axis of the turbomachine.

12. A method, comprising:
    removing a portion of a part to create a first surface;
    removing another portion of the part to create a second surface;
    adding a section to the part, the section including an overhung section that lacks structural support in a portion thereof, the adding including:
      positioning the second surface of the part substantially horizontal;
      sequentially layering a first plurality of material layers on the second surface extending in a first direction such that the first plurality of material layers creates a stair-stepped extension of the first surface;
      rotating the part to position the first surface of the part substantially horizontal;
      sequentially layering a second plurality of material layers on the first surface and the stair-stepped extension of the first surface, wherein the second plurality of material layers extend in a second direction, different from the first direction, and meet with the first plurality of material layers,
    wherein the first plurality of material layers and the second plurality of material layers collectively approximate dimensions of the section including the overhung section and are non-coplanar relative to one another; and
    machining the first plurality of material layers and the second plurality of material layers to form the section including the overhung section.

* * * * *